US009088864B2

(12) United States Patent
Flanagan et al.

(10) Patent No.: US 9,088,864 B2
(45) Date of Patent: Jul. 21, 2015

(54) SYSTEMS AND METHODS FOR ESTABLISHING SECURE COMMUNICATION USING CLOSE PROXIMITY WIRELESS COMMUNICATION

(71) Applicant: Brigham Young University, Provo, UT (US)

(72) Inventors: John Kelly Flanagan, Orem, UT (US); Steven Charles Cook, Lafayette, CO (US)

(73) Assignee: Brigham Young University, Provo, UT (US)

( * ) Notice: Subject to any disclaimer, the term of this patent is extended or adjusted under 35 U.S.C. 154(b) by 131 days.

(21) Appl. No.: 14/045,512

(22) Filed: Oct. 3, 2013

(65) Prior Publication Data

US 2014/0099887 A1    Apr. 10, 2014

Related U.S. Application Data

(60) Provisional application No. 61/711,388, filed on Oct. 9, 2012, provisional application No. 61/803,770, filed on Mar. 20, 2013.

(51) Int. Cl.
*H04B 5/00* (2006.01)
*H04W 4/02* (2009.01)
*H04W 4/00* (2009.01)

(52) U.S. Cl.
CPC ............. *H04W 4/008* (2013.01); *H04B 5/0031* (2013.01); *H04W 4/023* (2013.01)

(58) Field of Classification Search
USPC ............. 455/41.1, 414.1, 435.1, 435.2, 556.1
See application file for complete search history.

(56) References Cited

U.S. PATENT DOCUMENTS

| 8,880,028 | B2 | 11/2014 | Han |
| 8,929,861 | B2 | 1/2015 | Duque et al. |
| 2008/0090595 | A1* | 4/2008 | Liu et al. ........................ 455/461 |
| 2012/0099887 | A1 | 4/2012 | Shokaku |
| 2013/0215467 | A1 | 8/2013 | Fein et al. |
| 2014/0004793 | A1* | 1/2014 | Bandyopadhyay et al. . 455/41.1 |

OTHER PUBLICATIONS

Office Action mailed Feb. 20, 2015, for U.S. Appl. No. 14/045,518, filed Oct. 3, 2013.

(Continued)

*Primary Examiner* — Blane J Jackson
(74) *Attorney, Agent, or Firm* — Stoel Rives LLP

(57) ABSTRACT

The present disclosure provides systems and methods for utilizing close proximity wireless communication (CPWC) technology for a secure out-of-band (OOB) transfer of communication information between two or more devices at close range. The communication information may then be used to establish a secure communication channel over a greater distance than possible using CPWC technologies. In various embodiments, a host device may include a processing unit in communication with a communication module and a separate CPWC module. An edge device may include a processing unit in communication with a communication module and a CPWC tag. The CPWC tag may be configured to receive communication information from the CPWC module of the host device. The edge device may then use the communication information to facilitate secure communication via the communication module of the edge device and the communication module of the host device.

20 Claims, 10 Drawing Sheets

(56) References Cited

OTHER PUBLICATIONS

Suomalainen, J. et al. "Security Associations in Personal Networks: A Comparative Analysis," Security and Privacy in Ad-hoc and Sensor Networks: Lecture Notes in Computer Science, pp. 43-57, 2007.
Saxena, N. et al, "Secure Device Pairing based on a Visual Channel," IEEE Symposium on Security and Privacy, pp. 6-313, 2006.
Camtepe, S.A. et al. "Combinatorial Design of Key Distribution Mechanisms for Wireless Sensor Networks," I2006 IEEE Symposium on Security and Privacy, 15(2):346-358, Apr. 2007.
Rasumussen, K. et al., "Proximity-based Access Control for Implantable Medical Devices," CCS '09 Proceedings of the 16th ACM conference on Computer and communications security, 2009.
Akyildiz, I.F. et al. "Wireless sensor networks: a survey," Broadband and Wireless Networking Laboratory, School of Electrical and Computer Engineering, Georgia Institute of Technology, 2001.
Eltoweissy, M. et al. "Lightweight Key Management for Wireless Sensor Networks," I2004 IEEE International Conference on, pp. 813-818, 2004.
Gaubatz, G. et al., "State of the Art in Ultra-Low Power Public Key Cryptography for Wireless Sensor Networks," PerCom 2005 Workshops—Third IEEE Conference on Persuasive Computing and Communications WorkshopsT, pp. 146-150, Mar. 2005.
Gehrmann, C. et al., "Enhancements to Bluetooth Baseband Security," Proceedings of Nordsec, 2001:191-230, 2001.
Huang, S. et al., "Adaptive Random Key Distribution Schemes for Wireless Sensor Networks," In D.T. Lee, S.P. Shieh, and J.D. Tygar, editors, Computer Security in the 21st Century, pp. 91-105. Springer US, 2005.
Čagalj, M.et al., "Key Agreement in Peer-to-Peer Wireless Networks," Proceedings of the IEEE, 94(2):467-478, 2006.
Hussain, S. et al. "An efficient key distribution scheme for heterogeneous sensor networks," In Proceedings of the 2001 international conference on Wireless communications and mobile computing, IVVCNIC '07, pp. 388-392, New York, NY, USA, 2007. ACNI.
Kuo, C. et al. "Low-cost Manufacturing, Usability, and Security: An Analysis of Bluetooth simple pairing and Wi-Fi Protected Setup," In Sven Dietrich and Rachna Dhamija, editors, Financial Cryptography and Data Security, vol. 4886 of Lecture Notes in Computer Science, pp. 325-340. Springer Berlin, Heidelberg, 2007.
Ming, L. et al., "Group Device Pairing Based Secure Sensor Association and Key Management for Body Area Networks," 2010 Proceedings IEEE INFOCOM, pp. 1-9, Mar. 2010.
Miller, V., "Use of Elliptic Curves in Cryptography," Advances in Cryptology; CRYPTO '85 Proceedings; Lecture Notes in Computer Science, pp. 417-426, 1986.
Gehrmann, M. et al., "Security in personal area networks," In C. J. Mitchell, editor, Security for Mobility, pp. 191-230, 2004.
Gehrmann, M. et al., "Manual authentication for wireless devices." Cryptobytes, p. 7, 2004.
Oliveira, L.B. et al., "Secleach—A Random Key Distribution Solution for Securing Clustered Sensor Networks," Fifth IEEE International Symposium on Network Computing and Applications, 2006 (NCA 2006), pp. 145-154, Jul. 2006.
Oliveira, L.B. et al., "TinyPBC: Pairings for Authenticated Identity Based Non-interactive Key Distribution in Sensor Networks," Computer Communications, 34(3):485-493, 2011. Special Issue of Computer Communications on Information and Future Communication Security.
McCune; J.M. et al., "Seeing-Is-Believing: Using Camera Phones for Human-Verifiable Authentication," 2005 IEEE Symposium on Security and Privacy, (PerCom 2009), pp. 110-124, 2005.
Kainda, R. et al., "Usability and Security of Out-of-Band Channels in Secure Device Pairing Protocols," Proceedings of the 5th Symposium on Usable Privacy and Security, 2009.
Gollakota, S., "Secure In-Band Wireless Pairing," Massachusetts Institute of Technology, pp. 10-10, 2011.
Kumar, A. et al., "A Comparative study of Secure Device Pairing Methods," IEEE International Conference on Persuasive Computing and Communications, 2009 (PerCom 2009), pp. 1-10, 2009.
Soriente, C. et al., "Beda: Button-Enabled Device Association," Computer Science Department, University of California, Irvine, E-mail: {csorient.gts.euzun}@ics.uci.edu, 2007.
Uzun, E. et al., "Usability Analysis of Secure Pairing Methods," Nokia Research Center, NRC-TR-2007-002, In Sven Dietrich and Rachna Dhamija, editors, Financial Cryptography and Data Security, vol. 4886 of Lecture Notes in Computer Science, pp. 307-324. Springer Berlin Heidelberg, 2007.
Vaudenay, S. "Secure communications Over Insecure Channels Based on Short Authenticated Strings," Advances in Cryptology-CRYPTO, pp. 309-326, 2005.
Wander, A.S. et al., "Energy Analysis of Public-Key Cryptography for Wireless Sensor Networks," Third IEEE International Conference on Persuasive Computing and Communications, 2005 (PerCom 2005), pp. 324-328, Mar. 2005.
Kobsa, A. et al., "Serial Hook-ups: A Comparative Usability Study of Secure Device Pairing Methods," Proceedings of the 5th Symposium on Usable Privacy and Security, 2009.
Balfanz, D.K. et al., "Talking to strangers: Authentication in ad-hoc wireless networks," Proceedigns of Network and Distributed System Security Symposium 2002 (NDSS '02) 2002.
Goodrich, M. T. et al., "Loud and Clear: Human-Verifiable Authentication Based on Audio," 26th IEEE International Conference on Distributed Computing Systems, pp. 10-10, 2006.

* cited by examiner

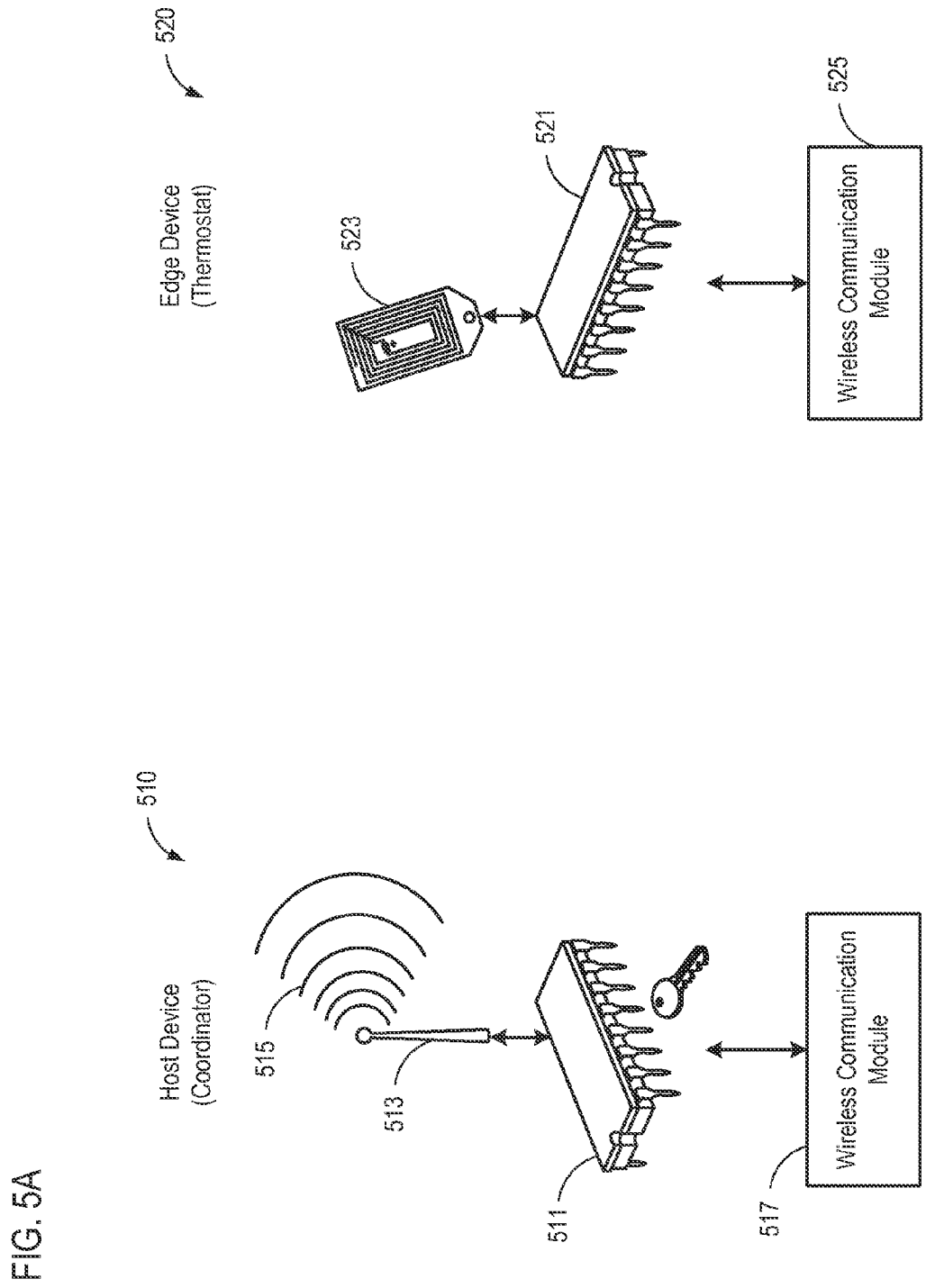

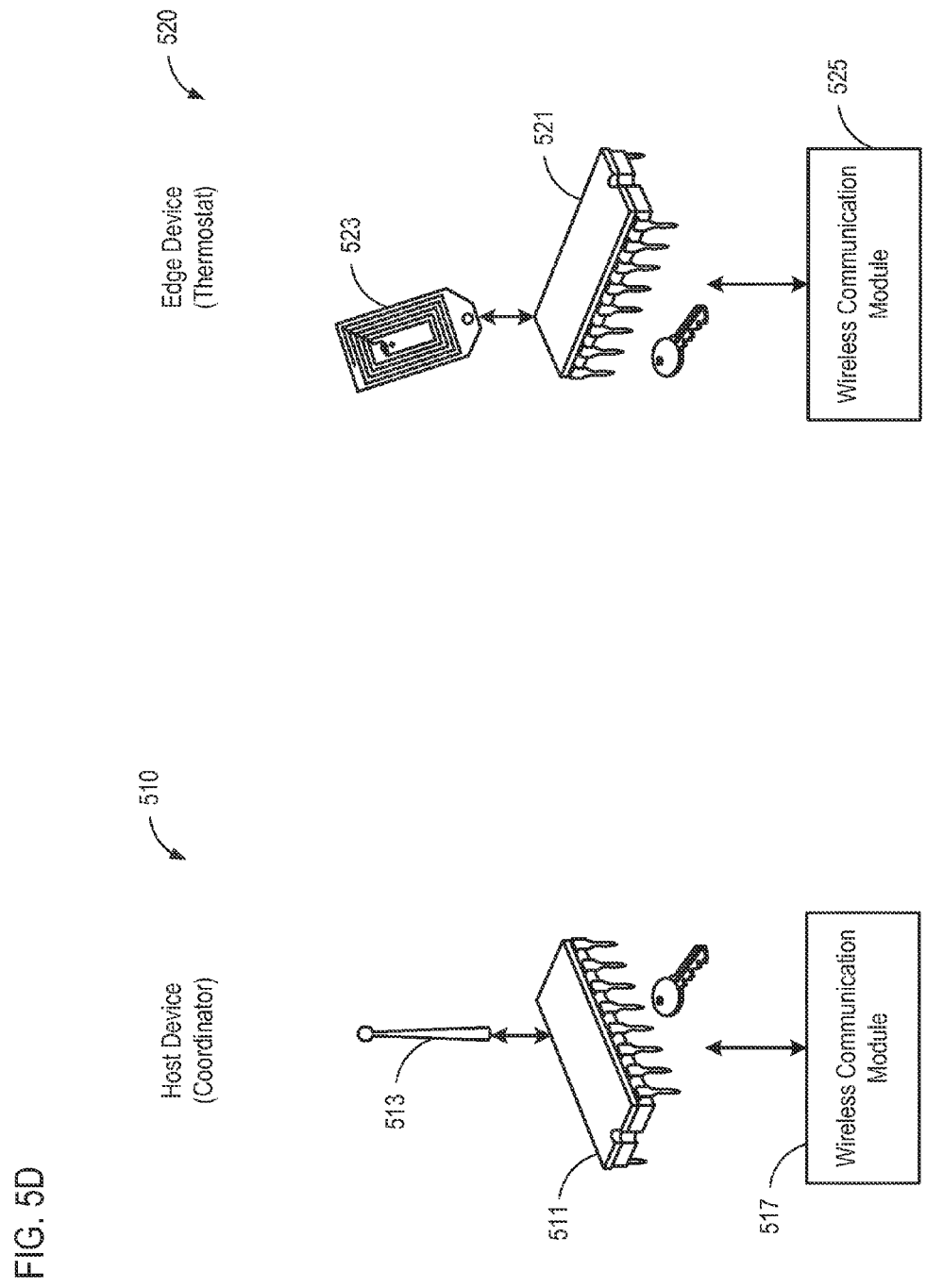

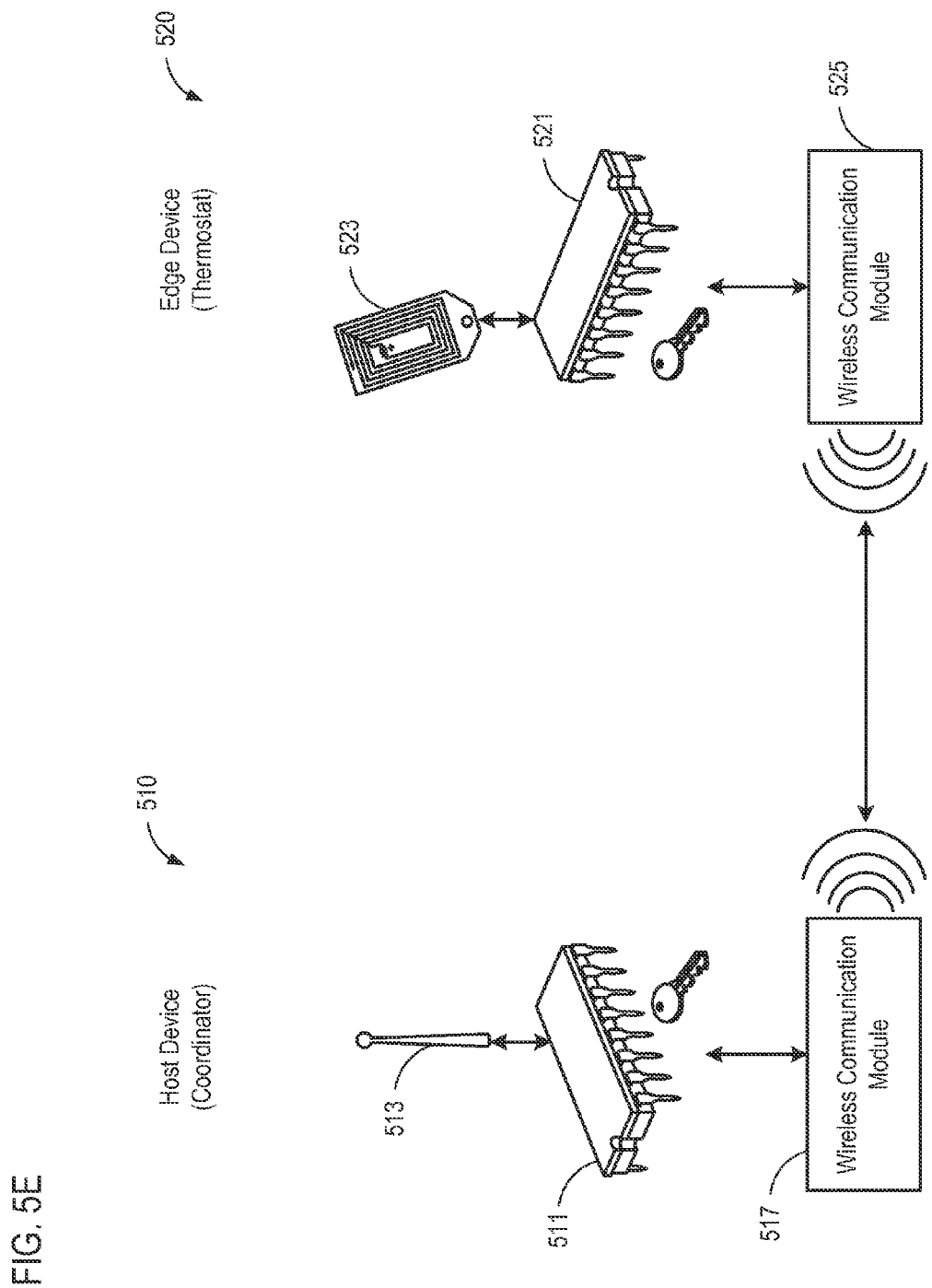

SYSTEMS AND METHODS FOR ESTABLISHING SECURE COMMUNICATION USING CLOSE PROXIMITY WIRELESS COMMUNICATION

RELATED APPLICATIONS

This U.S. patent application claims priority under 35 U.S.C. §119(e) to U.S. Provisional Application No. 61/711, 388 filed Oct. 9, 2012, titled "Dynamic Key Establishment via Near-Field Communications," which application is hereby incorporated by reference in its entirety. This U.S. patent application also claims priority under 35 U.S.C. §119(e) to U.S. Provisional Application No. 61/803,770 filed Mar. 20, 2013, titled "Dynamic Key Establishment via Near-Field Communications," which application is also hereby incorporated by reference in its entirety.

TECHNICAL FIELD

This disclosure relates to electronic communication. Specifically, this application relates to out-of-band network configurations using close proximity wireless communication technologies.

BRIEF DESCRIPTION OF THE DRAWINGS

Non-limiting and non-exhaustive embodiments of the disclosure are described herein, including various embodiments of the disclosure illustrated in the figures listed below.

FIG. 5A illustrates a host device with a key, and an edge device without the key.

FIG. 5D illustrates the key transferred from the dynamic NFC tag to the processing unit of the edge device.

FIG. 5E illustrates the edge device securely communicating with the host device via the wireless communication modules using the exchanged key.

Figure 1:
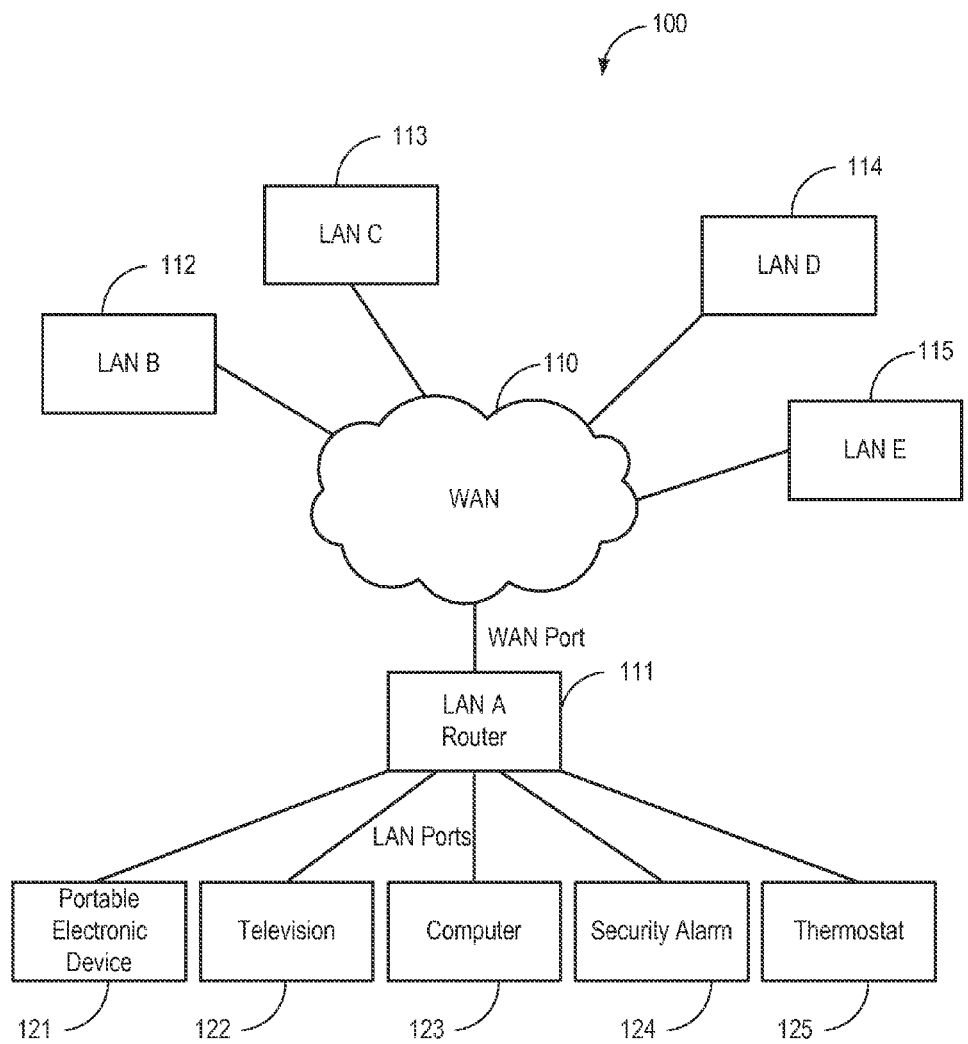
FIG. 1 illustrates an embodiment of multiple local area networks (LANs) connected to a wide area network (WAN).

The illustrated and described features, structures, and/or characteristics of the systems and methods described herein may be combined in any suitable manner in one or more alternative embodiments, and may differ from the illustrated embodiments.

DETAILED DESCRIPTION

According to various embodiments, a close proximity wireless communication (CPWC) technology may be used for a secure out-of-band (OOB) transfer of communication information between two or more devices at close range. The communication information may then be used to establish a secure communication channel over a greater distance than possible using CPWC techniques (e.g., via a Wi-Fi communication channel).

Throughout this disclosure, near field communication (NFC) is used as the exemplary CPWC. However, it will be appreciated that any of a wide variety of alternative CPWC systems and methods may be substituted in many of the embodiments described herein. Suitable CPWC systems and methods include any communication method or system configured to allow short-range wireless communication (i.e., less than approximately several tens of centimeters). Examples of suitable CPWC systems and methods include NFC, near-body electric-field communication, TransferJet, variations of Bluetooth including Bluetooth low energy, and other wireless magnetic and/or electromagnetic short-range data transfer techniques, including those using radio frequency identification (RFID).

In various embodiments, communication information is described as being exchanged between two wireless devices. As used herein, the term "exchange" includes both the unidirectional transmission and the bidirectional transceiving of data. Thus, two devices can be said to exchange information, even if one of the devices only transmitted data and the other device only received data.

In some embodiments, one or more of the devices may utilize the communication information exchanged via NFC to securely communicate via a second communication channel. The second communication channel may be considered the in-band communication channel and the NFC communication channel may be considered the OOB communication channel. The in-band communication channel may allow for communication over a greater distance than possible with NFC. For example, a host device may transmit a password to an edge device using NFC. The edge device may then communicate with the host device over a Wi-Fi network using the exchanged password.

The presently described systems and methods for establishing secure communication using NFC may be applicable to any of a wide variety of network topologies, technologies, and protocols. For instance, it may be useful to provide edge devices with various configuration settings and/or authentication data to allow the edge devices to connect to a router in a local area network (LAN). As a specific example, a personal computing device may be an edge device that is capable of connecting to a Wi-Fi router functioning as a host device. A user may select an SSID on the personal computing device and provide a corresponding password in order to connect the personal computing device to the Wi-Fi router.

As another example, it may be useful to pair edge devices in a Zigbee network with a Zigbee coordinator. Pairing the Zigbee edge devices with the Zigbee coordinator may include the unidirectional or bidirectional exchange of communication information regarding the Zigbee network.

In still other embodiments, any combination of any network types, topologies, technologies, protocols, and/or other network definitions may be combined. For example, any of a wide variety of routers, modems, hubs, switches, and other network components may facilitate the interconnection of various LANs utilizing disparate technologies and/or provide interconnections via a wide area network (WAN).

Various embodiments of this disclosure relate to the secure exchange of communication information between two devices for establishing a secure communication channel. The "exchange" of communication information may be unidirectional or bidirectional in the various embodiments, as appropriate and consistent with specific embodiments. The communication information may be any information used by one or more of the communicating devices for network communication. For example, communication information may include any network configuration setting, communication parameter, protocol identifier, port number, network address, keychain information, code, digital signature, certificate, passphrase, login information, SSID, authentication key, password, and/or any other network framework data. The communication information may also relate to specific security requirements, light-weight programs or add-ons, and/or virtual private network setting information.

As a specific example, two devices may exchange a passkey. The passkey may be transferred from one device to the other device, or the passkey may be jointly generated using information from each of the devices. The passkey may be used to establish a secure communication channel, encrypt and decrypt communication, and/or otherwise facilitate secure communications between the two devices.

In various embodiments, a user may, at least partially, provide communication information to an edge device and/or a host device to facilitate secure communication between the edge device and the host device. In other embodiments, communication information may be automatically or semi-automatically transferred between the devices using an in-band data transfer. That is, communication information may be transmitted between devices using the same communication technology (medium, protocol, etc.) that you are trying to protect with the communication information. In such embodiments, it may be difficult to securely exchange the communication information. For example, if two devices want to communicate via Wi-Fi, it may be difficult to use Wi-Fi to securely exchange (unidirectional or bidirectional exchange) secret communication information, as other listening devices may intercept the transaction.

In some embodiments, a user may provide communication information manually to one or more devices in a network. For example a user may select a Wi-Fi network on a laptop and provide a password to allow the laptop to join the selected Wi-Fi network. Manually entering communication information may be inconvenient and/or introduce the possibility of human error.

A key aspect of some lighter-weight wireless protocols, such as Zigbee, is that the devices are small and/or cheap. Such Zigbee devices may not have keyboards, mice, displays, and/or other peripheral devices. Accordingly, it may be difficult or impractical to manually provide communication information to such devices. In any event, manually entering communication information, including passwords and other network settings and/or parameters, may be inconvenient and/or introduce the possibility of human error.

According to various embodiments, communication information may be exchanged using an out-of-band (OOB) communication channel. For example, if the communication modules of two devices utilize Wi-Fi, the two devices may utilize an OOB communication module to exchange communication information. An OOB communication module may utilize infrared, ultrasonic, visual light, sound, and/or human interaction to more securely transfer communication information.

According to one embodiment, a host device provides communication information to an edge device using one or more of infrared, ultrasonic, visual light, sound, and/or human interaction. The edge device then uses the communication information received via the OOB communication channel to establish a secure communication channel using a different (i.e., the in-band communication channel) communication channel (e.g., Wi-Fi, Zigbee, 3G, etc.).

According to various embodiments, a CPWC system and/or method, such as NFC, is utilized as an OOB communication channel to exchange communication information. Continuing to use NFC as the exemplary CPWC, exchanging communication information via NFC has multiple advantages, including: (1) it minimizes the risk of accidently joining the wrong network; (2) it reduces the likelihood of user error, as no manual data or button pushes are involved; (3) it is easily performed by bringing devices within close proximity of one another; (4) pairing can be performed relatively quickly; and (5) it is relatively secure.

Regarding security, the exchange of communication information using NFC as an OOB communication channel prevents attackers from eavesdropping, impersonation, data modification attacks, and other security risks. For instance, the possibility of man-in-the-middle attacks are reduced or prevented, as long as physical access to the host device is limited. The NFC communication may be limited to several tens of centimeters, and the frequency used for NFC, approximately 13.56 MHz, may be inherently difficult to eavesdrop.

According to various embodiments of the systems and methods described herein, a host device may include a microprocessor or other processing unit. The microprocessor may be in communication with a communication module and an NFC module. The communication module may be a wireless communication module, such as a Zigbee communication module or a Wi-Fi communication module. In other embodiments, the communication module may be an Ethernet communication module or other wired communication module. The NFC module may be at least an NFC writer configured to write information to NFC tags, but may also be an NFC reader/writer in some embodiments. The microprocessor may communicate with the NFC module and the communication module via physical connections (e.g., wires, traces, etc.) or using a wireless communication technology.

An edge device may include a microprocessor or other processing unit. The microprocessor may be in communication with a communication module and a dynamic NFC tag. The microprocessor may communicate with the dynamic NFC tag and the communication module via physical connections (e.g., wires, traces, etc.) or using a wireless communication technology. The communication module associated with the edge device may be configured to communicate with the communication module associated with the host device. The dynamic NFC tag may be writeable by the NFC module, such that the NFC module associated with the host device can write communication information (e.g., password, parameters, settings, passkey, etc.) to the dynamic NFC tag. The dynamic NFC tag may also be readable at least by the microprocessor of the edge device.

Accordingly, the microprocessor of the edge device may be configured to read the communication information received by the dynamic NFC tag and then use the received communication information to securely communicate with the host device via the communication module. In various embodiments, the dynamic NFC tag may not be NFC readable and/or the received communication information may be erased, purged, or otherwise expire from the dynamic NFC tag after the communication information is made available to the microprocessor of the edge device or a memory accessible by the microprocessor of the edge device. The deletion of the communication information from the dynamic NFC tag may prevent its discovery by attackers.

According to various embodiments, any of the various components of the edge device and the host device may be combined into a single component and/or incorporated within a larger electronic or mechanical system. For example, the processing unit may be embodied as application-specific hardware, software, and/or firmware to facilitate the transfer of the communication information from the dynamic NFC tag to a location for use by the communication module for secure communications. In one embodiment, a single secure communication component may perform the functions described herein as being performed by one or more of the processing unit, the NFC (or other CPWC) tag and/or module, and the communication module.

In various embodiments, the communication information may be generated by the host device and shared, via NFC, with the edge device. In other embodiments, the communication information may be generated by the host device and/or the edge device based on a bidirectional exchange of communication information. For example, in some embodiments, the NFC module of the host device may read information stored on the dynamic NFC tag of the edge device and use the read information to generate communication information specific to the particular edge device. In another embodiment, the host device and the edge device may each exchange a portion of the communication information. One or both of the devices may combine the OOB exchanged portions of the information to generate shared communication information that is used for secure communication on the in-band communication channel.

A specific embodiment is described below including a Wi-Fi router, a laptop computer as an edge device, a Zigbee coordinator as an edge device of the Wi-Fi router, and a thermostat as an edge device of the Zigbee coordinator. The Wi-Fi router may include a Wi-Fi communication module connected to a microprocessor. Additionally, the Wi-Fi router may include at least an NFC writer. In some embodiments, the Wi-Fi router may include a fully NFC-enabled device configured to read and write NFC tags. In other embodiments, the Wi-Fi router may include a partially NFC-enabled device able to write NFC tags, but not read NFC tags.

The laptop may include a Wi-Fi communication module as well. The systems and methods described herein may be used to establish a secure communication channel via the Wi-Fi communication modules. For instance, the laptop computer may include a dynamic NFC tag in communication with a processing unit. The processing unit may also be in communication with the wireless communication module. The processing unit may be the primary processor of the laptop computer or may be a separate processing unit.

The laptop computer, or at least the dynamic tag portion of the laptop computer may be brought into close proximity (e.g., less than a few tens of centimeters) with the Wi-Fi router. When sufficiently close for NFC communication, the NFC module of the Wi-Fi router may transmit communication information (e.g., SSID information and a WPA2 password) to the dynamic NFC tag of the laptop computer. The processing unit of the laptop computer may then read the communication information received by the dynamic NFC tag. The Wi-Fi communication module of the laptop computer may then use the received communication information to establish a secure communication channel and/or securely communicate with the Wi-Fi communication module of the Wi-Fi router.

In the specific embodiment, the Zigbee coordinator may function as an edge device with respect to the Wi-Fi router and as a host device with respect to the thermostat. Accordingly, the Zigbee coordinator may include a dynamic NFC tag and be paired (i.e., exchange communication information) with the Wi-Fi router in the same manner as described with regard to the laptop computer. The Zigbee coordinator may also include an NFC module (fully or partially NFC-enabled, but at least able to write NFC tags).

The thermostat may be a relatively simple device configured to perform various thermostat functions and communicate with the Zigbee coordinator using a Zigbee communication module. The Zigbee communication module of the thermostat may be paired with the Zigbee coordinator. Accordingly, the thermostat may include a dynamic NFC tag for receiving communication information from the NFC module of the Zigbee coordinator. The Zigbee communication module of the thermostat may use the communication information received by the dynamic NFC tag to securely communicate with the Zigbee communication module of the Zigbee coordinator. As described above, the thermostat may be brought into close proximity with the Zigbee coordinator for the NFC module of the Zigbee coordinator to transmit the communication information to the dynamic NFC tag of the thermostat.

The presently described systems and methods may be utilized to deploy a secure wireless (or wired) network using an OOB exchange of communication information between devices. The described systems and methods may allow for the deployment of a wireless network in a hostile or otherwise unsecure location, such as a public area, a hospital, a military location, and/or the like.

In one example involving a cable set top box, a user may only subscribe to a limited number of channels. A second device, such as a cellular phone, laptop, or other electronic device, may be configured to communicate using any of the CPWC systems and/or methods described herein to transfer a channel line-up of available channels (based on the user subscription) between the cable set top box and the second device. For instance, in some embodiments, the second device may transfer the channel line-up to the set top box so that the set top box will be aware of the available (or unavailable channels). In other embodiment, the set top box may transfer the channel line-up to the second device so that the second device is aware of the available (or unavailable channels). The exchange of the channel line-up may be performed using NFC, Bluetooth low energy, and/or another CPWC technology.

The phrases "connected to" and "in communication with" include any form of communication between two or more components, including mechanical, electrical, magnetic, and electromagnetic interaction. Two components may be connected to or in communication with each other, even though they may not be in direct contact with each other, and/or even though there may be intermediary devices between the two components.

Accordingly, in some embodiments, a coordinator may transfer communication information to a first edge device. The coordinator may transfer the same, different, and/or complimentary communication information to a second edge device. The second edge device may be said to communicate with the coordinator, even if such communication takes place through an intermediary device, such as the first edge device.

As used herein, the term "electronic device" may refer to any of a wide variety of wireless or wired electronic devices capable of data communication, including sensors, relays, regulators, controllers, monitors, communication devices, personal electronic devices, computers, laptops, tablets, personal computers, network devices, routers, hubs, switches, network node devices, network host devices, and the like. Moreover, an electronic device may refer to any of a wide variety of networking and/or communication modules, systems, and/or components that may be incorporated as a component in a larger system or device.

Some of the infrastructure that can be used with embodiments disclosed herein is already available, such as: general-purpose computers, computer programming tools and techniques, digital storage media, and communications networks. An electronic device may include a processing unit, such as a microprocessor, microcontroller, logic circuitry, or the like. The processing unit may include a special purpose processing device, such as an ASIC, PAL, PLA, PLD, FPGA, or other customized or programmable device. An electronic device may also include a computer-readable storage device, such as non-volatile memory, static RAM, dynamic RAM, ROM, CD-ROM, disk, tape, magnetic memory, optical memory, flash memory, or other computer-readable storage medium.

Aspects of certain embodiments described herein may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types. Similarly, hardware modules may include any of a wide variety of electrical, mechanical, and/or biological components. Thus, a module in general may refer to any combination of software, hardware, and/or firmware components configured to function a particular way. Any of a wide variety of programming languages and/or hardware architectures may be utilized in conjunction with the various embodiments described herein.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations. In addition, the steps of a method do not necessarily need to be executed in any specific order, or even sequentially, nor need the steps be executed only once, unless otherwise specified.

The embodiments of the disclosure may be understood by reference to the drawings, wherein like parts are designated by like numerals throughout. The components of the disclosed embodiments, as generally described and illustrated in the figures herein, could be arranged and designed in a wide variety of different configurations. Any of the various embodiments described herein may be combined in whole or in part with any other embodiment described herein.

The dynamic NFC tags illustrated and described herein may be embodied in any shape, size, and/or configuration. Substitution of other types of CPWC tags may be physically different but are intended to be represented by the illustrated NFC tags. As such, a "tag" as used herein includes any type of CPWC "tag" as applicable to the various alternative CPWC communication technologies. Thus, the term "tag" includes receiver, transceivers, and other receiving-components in a communication system. For example, a CPWC tag may be embodied as a TransferJet receiver and/or TransferJet transceiver. Alternatively, the CPWC tag may be embodied as a Bluetooth low energy receiver or transceiver.

Thus, the illustrated embodiments are not intended to convey any information regarding, size, configuration, functionality, connectivity, dimensions, or any other characteristic of any component, including those of the dynamic NFC tags. As previously stated, NFC modules, writers, readers, and tags are provided as examples of possible CPWC modules, writers, readers, and tags. Thus, the following detailed description of the embodiments of the systems and methods of the disclosure is not intended to limit the scope of the disclosure, as claimed, but is merely representative of possible embodiments.

FIG. 1 illustrates an embodiment of a system 100 of multiple local area networks (LANs) 111, 112, 113, 114, 115 connected to a wide area network (WAN) 110. As illustrated, a LAN router 111 may connect a LAN of edge devices, such as portable electronic device 121, television 122, computer 123, security alarm 124, and thermostat 125.

According to various embodiments, each of the various edge devices 121, 122, 123, 124, and 125 may be brought in close proximity with the host device 111 (LAN router) to receive communication information from the host device 111. Each of the edge devices 121, 122, 123, 124, and 125 may utilize the communication information to securely communicate over the LAN. For example, one or more of the edge devices 121, 122, 123, 124, and 125 may communicate with (and/or via) the LAN router 111 using the communication information. The communication information may be transferred from the LAN router 111 (as the host device) to one or more of the edge devices 121, 122, 123, 124, and 125 using any one of the various methods and/or systems described herein.

For example, the portable electronic device 121 may be brought into close proximity with the LAN router 111. The LAN router 111 may then transmit communication information to the portable electronic device 121. The LAN router 111 may transmit the communication information using an OOB NFC module to a dynamic NFC tag of the portable electronic device 121. A processing unit of the dynamic NFC tag of the portable electronic device 121 may read the communication information obtained by the dynamic NFC tag from the NFC module of the LAN router 111. The portable electronic device 121 may utilize the communication information to securely communicate with (and/or via) the LAN router 111.

The other edge devices 122, 123, 124, and 125 may receive communication information via the NFC methods described herein as well. As previously described, the communication information may include one or more of an authentication key, a password, login information, a passphrase, a certificate, a digital signature, a code, keychain information, a configuration setting, a network address, a port number, a protocol identifier, cryptographic keys, virtual private network settings, a channel, a personal preference, and a communication parameter. In some embodiments, the communication information may also include port forwarding information to facilitate the automatic or semi-automatic configuration of port forwarding of one or more of the edge devices 121-125 to enable access to the edge device 121-125 from the WAN 110.

Figure 2:
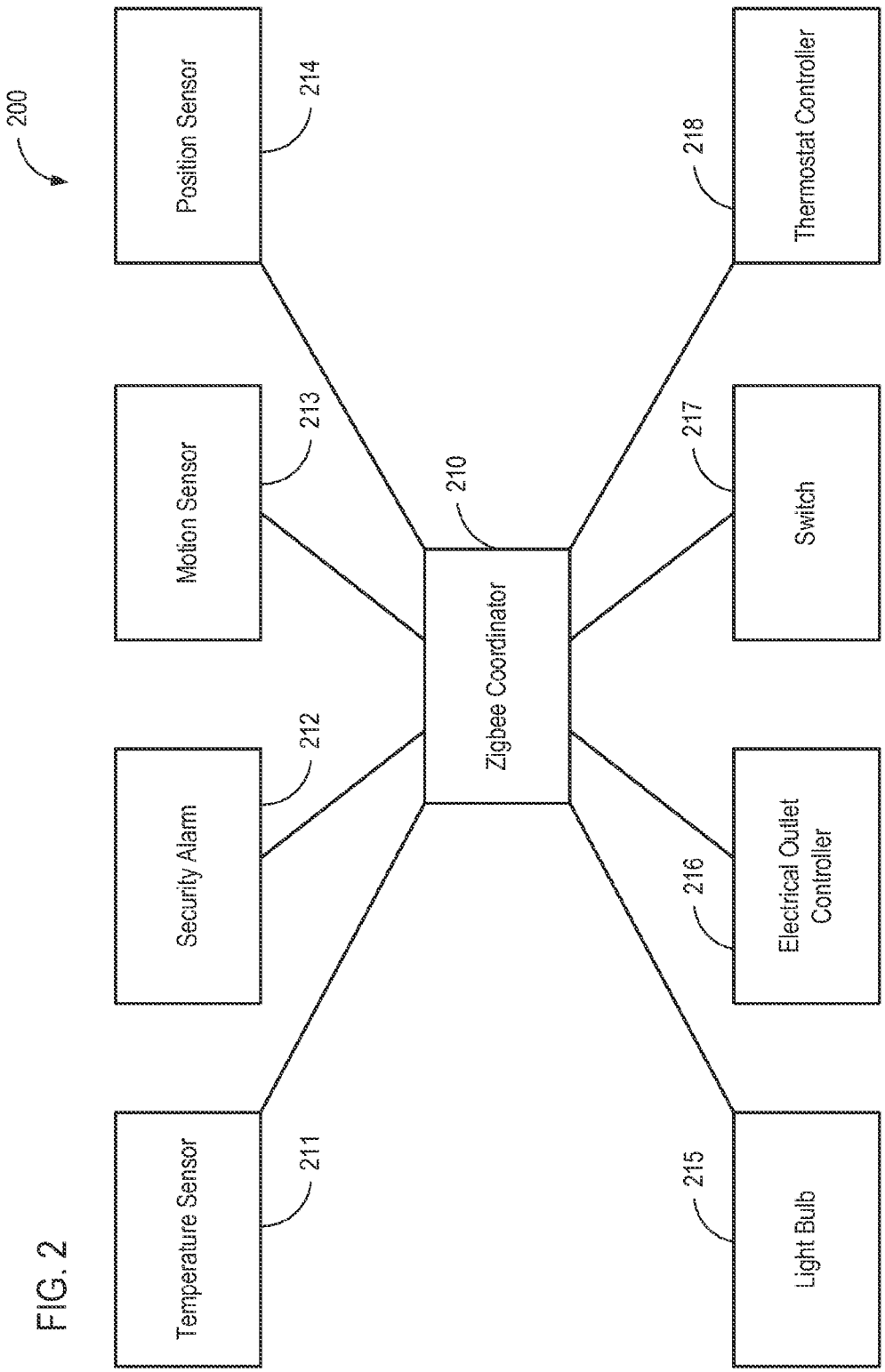
FIG. 2 illustrates an embodiment of a Zigbee network, including a Zigbee coordinator and multiple Zigbee edge devices.

FIG. 2 illustrates an embodiment of a Zigbee network 200, including a Zigbee coordinator 210 and multiple Zigbee edge devices 211, 212, 213, 214, 215, 216, 217, and 218. Similar to the connection of the edge devices described in conjunction with FIG. 1, each of the edge devices 211-218 may receive communication information for connecting to the Zigbee coordinator 210 via an OOB exchange of communication information. The OOB exchange of communication information may include a CPWC module of a host device (e.g., the Zigbee coordinator 210) transmitting the communication information to a CPWC tag of an edge device 211-218. In some embodiments, one or more of the Zigbee edge devices 211, 212, 213, 214, 215, 216, 217, and 218 may actively route data from, to, or between other edge devices and the coordinator 210. Any of the various systems and methods described herein for establishing a secure network and/or securely communicating may be used in conjunction with the Zigbee network illustrated in FIG. 2.

Figure 3:
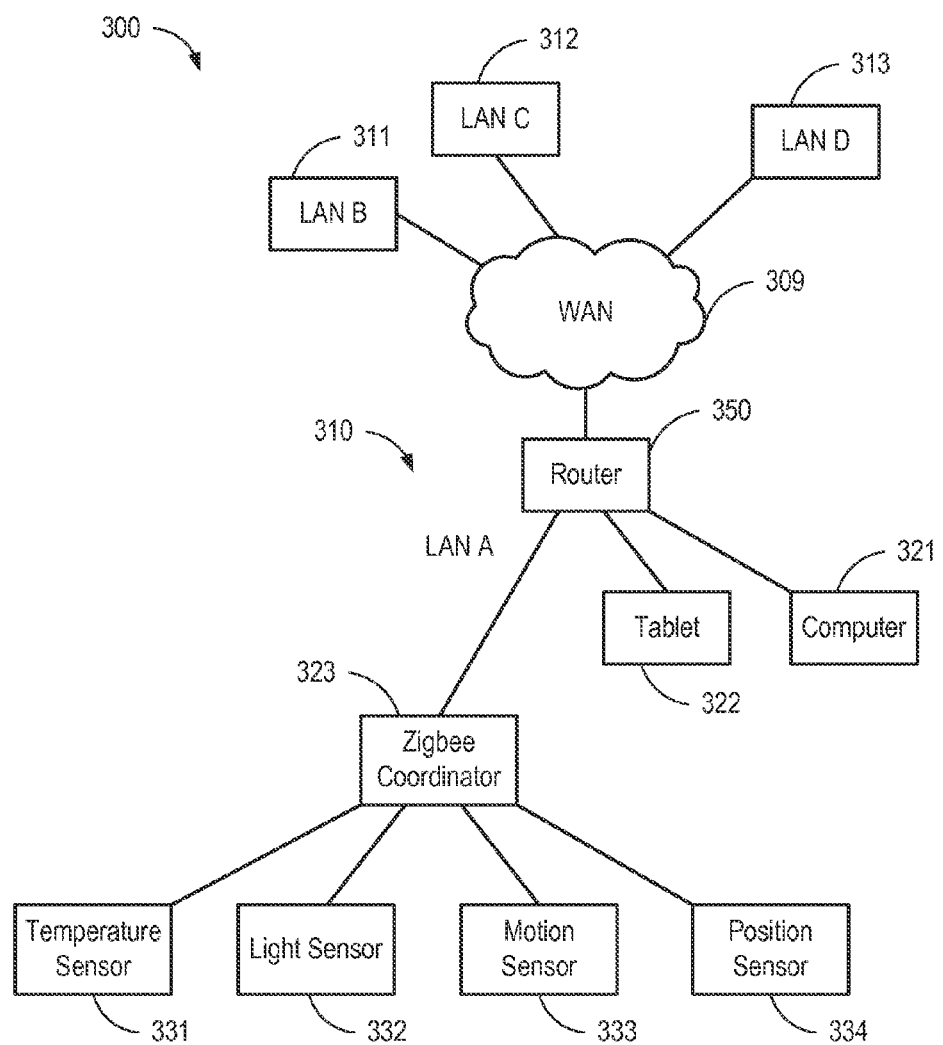
FIG. 3 illustrates an embodiment of a WAN, a local Wi-Fi network, various Wi-Fi edge devices, a local Zigbee network, and various Zigbee edge devices.

FIG. 3 illustrates an embodiment 300 of a WAN 309, various LANs 311, 312, 313, a local Wi-Fi network 310, a Wi-Fi router 350, various Wi-Fi edge devices 321 and 322, a local Zigbee coordinator 323, and various Zigbee edge devices 331, 332, 333, and 334. Using any of the various methods and systems described herein, the tablet 322 and computer 321 may receive communication information via a dynamic NFC tag from an NFC module of the Wi-Fi router 350. In the illustrated embodiment, the Zigbee coordinator 323 may function as an edge device and receive communication information from the Wi-Fi router 350 via an OOB exchange using a dynamic NFC tag and NFC module as well.

The Zigbee coordinator 323 may also function as a host device by providing Zigbee communication information to each of the Zigbee edge devices 331, 332, 333, and 334. As described in various embodiments herein, the Zigbee coordinator 323 may transmit, via an OOB NFC or other CPWC transmission, Zigbee communication information with the Zigbee edge devices 331-334. The Zigbee edge devices 331-334 may receive the communication information via dynamic NFC tags. A processing unit of each Zigbee edge device 331-334 may utilize the obtained communication information to communicate via a Zigbee communication module with the Zigbee coordinator 323.

Figure 4A:
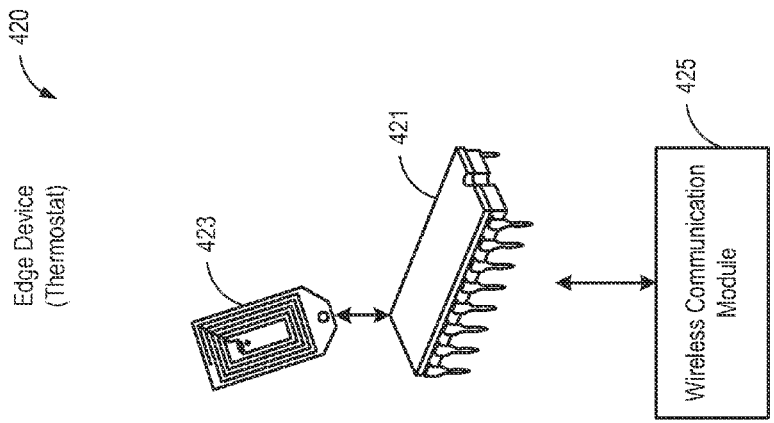
FIG. 4A illustrates an embodiment of a host device, including a processing unit, a wireless communication module, and an NFC module.

FIG. 4A illustrates an embodiment of a host device 410 (e.g., a coordinator), including a processing unit 411, a wireless communication module 417, and an NFC module 413. The processing unit 411 may be in communication with the wireless module 417 and/or the NFC module 413 via wires, traces, a wireless connection, and/or via another data connection.

As described herein, the host device 410 may include a sensor, relay, regulator, controller, monitor, communication device, personal electronic device, computer, laptop, tablet, personal computer, cellular phone, hotspot, network device, router, hub, switch, network node device, network host device, or the like. The host device 410 may be incorporated as part of a larger system.

The wireless communication module 417 may include one or more of a Zigbee communication module, a Z-Wave communication module, a Bluetooth communication module, an EnOcean communication module, a DECT communication module, a UWB communication module, a wireless USB communication module, a 6LoWPAN communication module, a Wi Max communication module, an LTE communication module, and/or a Wi-Fi communication module.

Figure 4B:
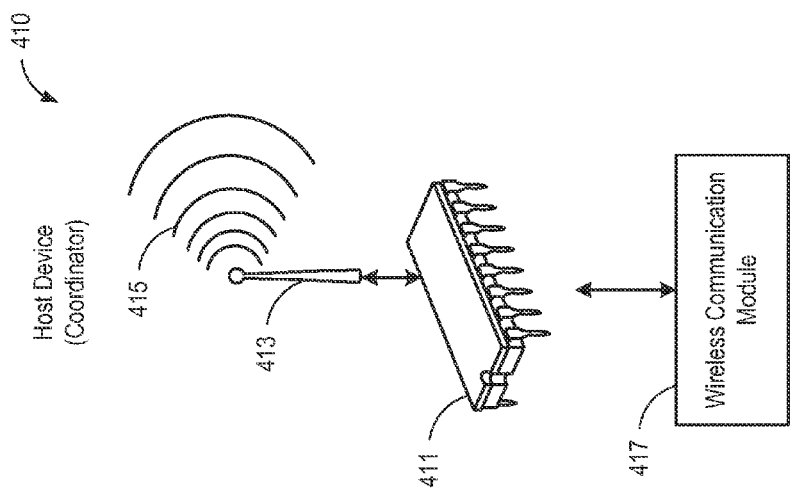
FIG. 4B illustrates an embodiment of an edge device, including a processing unit, a wireless communication module, and a dynamic NFC tag.

The NFC module 413 may be configured to transmit 415 communication information to an edge device 420 (FIG. 4B). The NFC module 413 may be substituted and/or augmented with any of a wide variety of CPWC modules. The NFC module 413 may be configured to write to a dynamic NFC tag. The NFC module 413 may also be configured to read dynamic NFC tags. According to various embodiments, the processing unit 411 may be configured to generate, read from memory, and/or otherwise determine communication information. In some embodiments, the NFC module 413 may be configured to read edge data from a dynamic NFC tag. The edge data may be used by the processing unit 411 to generate and/or otherwise determine communication information.

FIG. 4B illustrates an embodiment of an edge device 420 (e.g., a thermostat), including a processing unit 421, a wireless communication module 425, and a dynamic NFC tag 423. The processing unit 421 may be in communication with the wireless module 425 and/or the dynamic NFC tag 423 wirelessly, via wires, via traces, and/or via another data connection.

As described herein, the edge device 420 may include a sensor, relay, regulator, controller, monitor, communication device, personal electronic device, computer, laptop, tablet, personal computer, cellular phone, hotspot, network device, router, hub, switch, network node device, network host device, or the like. The edge device 420 may be incorporated as part of a larger system.

The wireless communication module 425 may include one or more of a Zigbee communication module, a Z-Wave communication module, a Bluetooth communication module, an EnOcean communication module, a DECT communication module, a UWB communication module, a wireless USB communication module, a 6LoWPAN communication module, a Wi Max communication module, an LTE communication module, and/or a Wi-Fi communication module. The wireless communication modules 425 and 417 (FIG. 4A) may be configured to securely communicate using the communication information.

Accordingly, the dynamic NFC tag 423 may be configured to receive the communication information from the NFC module 413 (FIG. 4A). In some embodiments, the dynamic NFC tag 423 may also be configured to contribute to the generation of the communication information and/or augment the communication to facilitate secure communications. For example, the NFC module 413 (FIG. 4A) may read data from the dynamic NFC tag 423 and use it to facilitate secure communication. Even in such embodiments, the processing unit 421 may read the communication information obtained by the dynamic NFC tag 423. The edge device 420 may then utilize the communication information to securely communicate via wireless communication module 425 with the wireless communication module 417 of the host device 410.

FIGS. 5A-5E illustrate an OOB exchange of communication information (illustrated as a key) from a host device 510 to an edge device 520. The communication information may be used to facilitate secure communications between the host device 510 and/or the edge device 520. For example, the communication information may include a network configuration setting, communication parameter, protocol identifier, port number, network address, keychain information, code, digital signature, certificate, passphrase, login information, SSID, authentication key, password, and/or any other network framework data.

FIG. 5A illustrates a host device 510 with a key (communication information) and an edge device 520 without the key (communication information). The processing unit 511 of the host device 510 may generate the communication information, as described above. The host device 510 may generate the communication information independent of the edge device 520. In other embodiments, the communication information used to facilitate secure communication between the host device 510 and the edge device 520 may be generated jointly by a bidirectional exchange of information between the NFC module 513 of the host device 510 and the NFC tag 523 of the edge device 520. The wireless communication modules 517 and 525 may utilize the communication information to communicate securely and/or establish a secure communication channel.

Figure 5B:
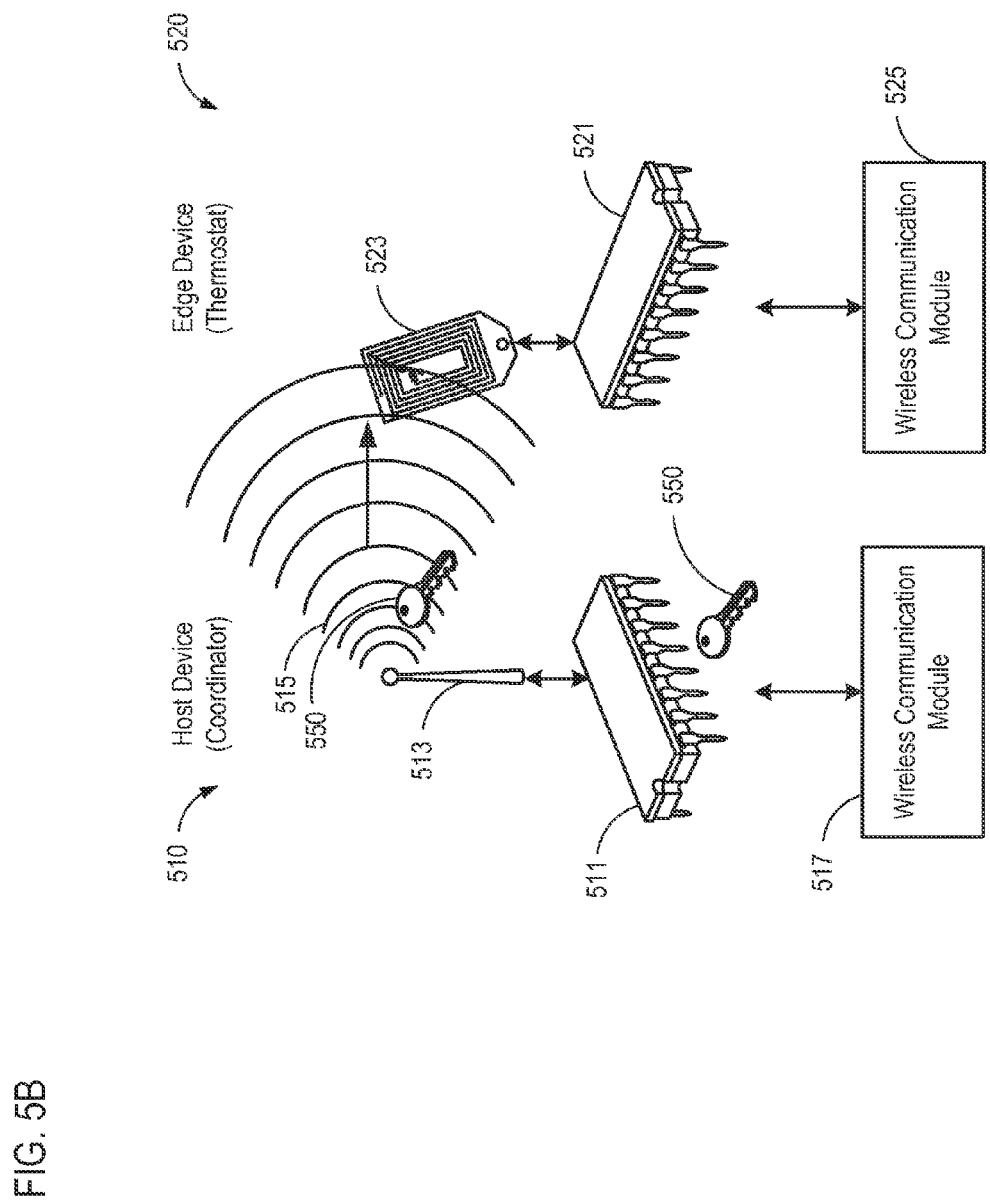
FIG. 5B illustrates the NFC module associated with the host device exchanging the key with the dynamic NFC tag associated with the edge device.

FIG. 5B illustrates the NFC module 513 associated with the host device 510 exchanging the communication information 550 with the dynamic NFC tag 523 associated with the edge device 520. The range of the NFC transfer 515 may be limited to a few tens of centimeters. As such, the exchange of the communication information 550 may be secure and nearly impervious to interception by an attacker.

Figure 5C:
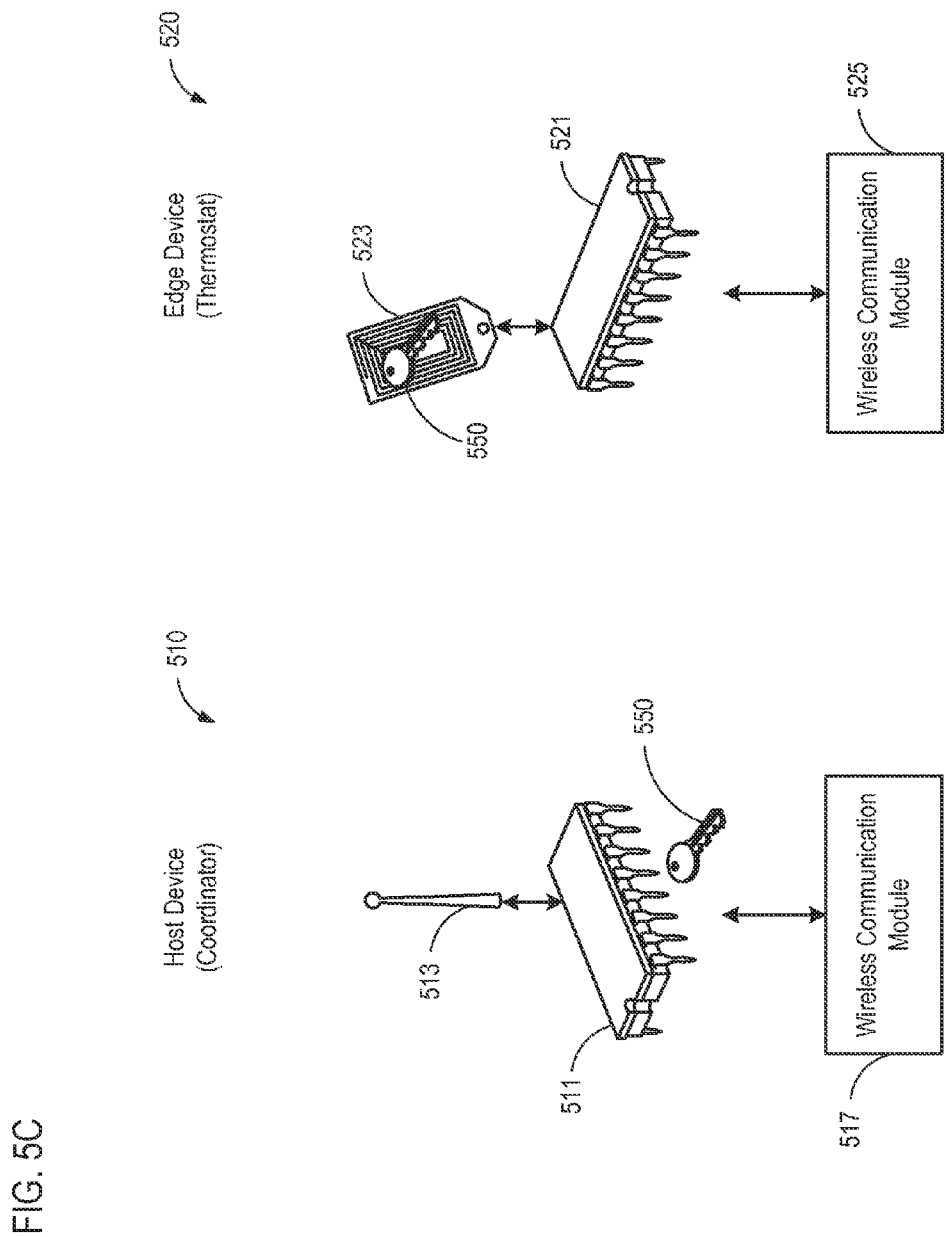
FIG. 5C illustrates the key transferred to the edge device.

FIG. 5C illustrates the communication information 550 transferred to the dynamic NFC tag 523 of the edge device 520. In some embodiments, the dynamic NFC tag 523 may be configured to push the obtained communication information 550 to memory accessible to the processing unit 521. The processing unit 521 may be configured to read the obtained communication information 550 from the memory. In other embodiments, the processing unit 521 may directly read the obtained communication information 550 on the dynamic NFC tag 523.

FIG. 5D illustrates the communication information transferred from the dynamic NFC tag 523 to the processing unit 521 of the edge device 520. According to various embodiments, the communication information may be erased, decay, and/or otherwise not be present on the dynamic NFC tag 523 after a short period of time and/or after it has been transferred and/or read by the processing unit 521 and/or memory accessible to the processing unit 521.

FIG. 5E illustrates the edge device 520 securely communicating with the host device 510 via the wireless communication modules 517 and 525 using the exchanged communication information. As described herein, the communication information may relate to any of a wide variety of communication settings or parameters for enhancing the security of the communication. For example, the host device 510 and the edge device 520 may encrypt and decrypt communication using the communication information.

Figure 6:
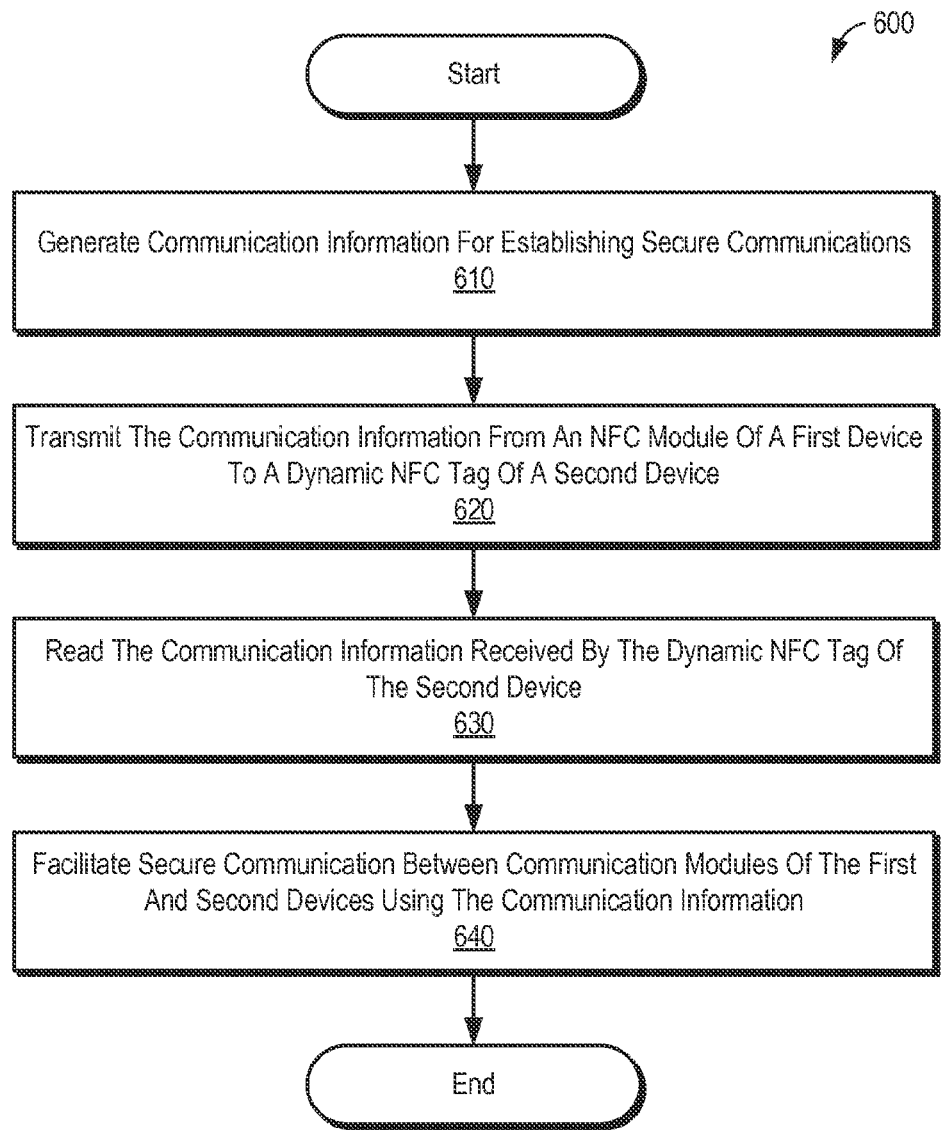
FIG. 6 illustrates a method for an out-of-band exchange of communication information between two devices using NFC to facilitate secure communication.

FIG. 6 illustrates a method 600 for an OOB exchange of communication information between two devices using NFC to facilitate secure communication over a disparate communication channel (i.e., the in-band communication channel). Initially, communication information may be generated 610 for establishing secure communication. Establishing secure communication may include establishing a secure communication channel and/or otherwise facilitating secure communications (e.g., encryption, channel selection, etc.).

An NFC module (or other CPWC module) of a first device may transmit 620 communication information to a dynamic tag (e.g., a dynamic NFC tag) of a second device. A microprocessor, or other processing unit, of the second device may read 630 the communication information obtained by the dynamic NFC tag. The second device (and/or the first device) may then use the obtained communication information to facilitate 640 secure communication between communications modules of the first and second devices.

The above description provides numerous specific details for a thorough understanding of the embodiments described herein. However, those of skill in the art will recognize that one or more of the specific details may be omitted, modified, and/or replaced by a similar process or system.

What is claimed:

1. A method for secure communication, comprising:
    obtaining, via a dynamic near field communication (NFC) tag associated with a first device, information from an NFC module associated with a second device;
    reading, via a first device processing unit, the information obtained by the first device dynamic NFC tag; and
    communicating, via a first device communication module, with a second device communication module using the obtained information from the second device NFC module,
    wherein the dynamic NFC tag comprises a partially NFC-enabled device, such that the dynamic NFC tag is read by the first device processing unit, but not written to by the first device processing unit.

2. The method of claim 1, wherein the first and second device communication modules each comprise a wireless communication module.

3. The method of claim 1, wherein the first and second device communication modules each comprise one of: ZigBee communication modules, Z-Wave communication modules, Bluetooth communication modules, EnOcean communication modules, DECT communication modules, UWB communication modules, wireless USB communication modules, 6LoWPAN communication modules, WiMax communication modules, LTE communication modules, and Wi-Fi communication modules.

4. A method for secure communication, comprising:
    obtaining, via a dynamic near field communication (NFC) tag associated with a first device, information from an NFC module associated with a second device;
    reading, via a first device processing unit, the information obtained by the first device dynamic NFC tag; and
    communicating, via a first device communication module, with a second device communication module using the obtained information from the second device NFC module,
    wherein the second device NFC module comprises a partially NFC-enabled device, such that the second device NFC module is configured to write information to the first device dynamic NFC tag, but not configured to read information on the first device dynamic NFC tag.

5. The method of claim 1, further comprising:
    generating, via a second device processing unit, the information;
    transmitting the information from the second device processing unit to the second device NFC module; and
    transmitting the information from the second device NFC module to the first device dynamic NFC tag.

6. The method of claim 5, further comprising:
    obtaining, via the second device NFC module, device information associated with the first device from the first device dynamic NFC tag, and
    wherein the information generated by the second device processing unit is generated using the device information obtained by the second device NFC module from the first device dynamic NFC tag.

7. The method of claim 1, further comprising:
    transmitting device information associated with the first device from the first device dynamic NFC tag to the second device NFC module; and
    facilitating communication between the first device and the second device using the obtained information from the second device and the device information associated with the first device.

8. The method of claim 1, wherein the obtained information is generated by a second device processing unit independent of any information associated with the first device.

9. The method of claim 1, further comprising removing the communication information from the first device dynamic NFC tag.

10. The method of claim 1, wherein the obtained information comprises at least one of an authentication key, a password, login information, a passphrase, a certificate, a digital signature, a code, keychain information, a configuration setting, a network address, a port number, a protocol identifier, a channel, a channel line-up, a preference, and a communication parameter.

11. An electronic device comprising:
- a dynamic near field communication (NFC) tag that is NFC-writable, wherein the dynamic NFC tag is configured to obtain information from a remote device NFC module;
- a processing unit in communication with the dynamic NFC tag, wherein the processing unit is configured to read the information obtained from the remote device NFC module; and
- a communication module in communication with the processing unit configured to communicate with a remote device communication module using the obtained information,
- wherein the dynamic NFC tag comprises a partially NFC-enabled device, such that the dynamic NFC tag is configured to be read by the processing unit, but not written to by the processing unit.

12. The device of claim 11, wherein the communication module of the electronic device comprises a wireless communication module.

13. The device of claim 11, wherein the communication module of the electronic device comprises one of: a ZigBee communication module, a Z-Wave communication module, a Bluetooth communication module, a EnOcean communication module, a DECT communication module, a UWB communication module, a wireless USB communication module, a 6LoWPAN communication module, a Wi Max communication module, an LTE communication module, and a Wi-Fi communication module.

14. The device of claim 11, wherein the dynamic NFC tag is configured to transmit device information associated with the electronic device to the remote device NFC module.

15. The device of claim 14, wherein the communication module of the electronic device is configured to communicate with the remote device communication module using the obtained information and the device information.

16. The device of claim 11, wherein the obtained information is configured to be erased from the dynamic NFC tag after the processing unit has read the information obtained by the dynamic NFC tag.

17. The device of claim 11, wherein the obtained information comprises at least one of an authentication key, a password, login information, a passphrase, a certificate, a digital signature, a code, keychain information, a configuration setting, a network address, a port number, a channel, a channel line-up, a preference, and a communication parameter.

18. A method for secure communication, comprising:
- obtaining, via a close proximity wireless communication (CPWC) tag associated with a first device, information from a CPWC module associated with a second device;
- reading, via a first device processing unit, the information obtained by the first device dynamic CPWC tag; and
- obtaining, via a third device CPWC tag, information from the second device CPWC module;
- reading, via a third device processing unit, the information obtained by the third device CPWC tag; and
- communicating, via a first device communication module, with a third device communication module using the obtained information from the second device CPWC module.

19. The device of claim 18, wherein each of the CPWC modules comprises one of a near field communication (NFC) module and a Bluetooth low energy module, and wherein each of the CPWC tags comprises one of a dynamic NFC tag and a Bluetooth low energy receiver, and wherein each of the communication modules comprises a Wi-Fi communication module.

20. The method of claim 18, wherein communicating, via the first device communication module, with the third device communication module using the obtained information comprises direct communication between the first device communication module and the third device communication module.

* * * * *